March 21, 1967  C. J. ARNDT ETAL  3,309,864
FLEXIBLE LINK CONNECTION
Filed Nov. 6, 1964

INVENTOR.
Charles J. Arndt
Walter Silks
BY
Herman E. Smith
ATTORNEY

United States Patent Office 3,309,864
Patented Mar. 21, 1967

3,309,864
FLEXIBLE LINK CONNECTION
Charles J. Arndt, Harvey, and Walter Silks, Downers Grove, Ill., assignors, by mesne assignments, to Westinghouse Air Brake Company, Pittsburgh, Pa., a corporation of Pennsylvania
Filed Nov. 6, 1964, Ser. No. 409,542
4 Claims. (Cl. 59—85)

The present invention relates generally to flexibly linked connections and more particularly to means for securing a rotatable hinge pin therein.

In many articles of manufacture such as cutter chains, conveyor chains, tractor shoes and the like, a pair of adjacent links are flexibly connected to each other by a hinge pin. The hinge pin ordinarily extends through a pair of overlapping links with at least one link being rotatable about the pin to provide flexibility. Very often, one end of the pin is provided with a shoulder and the other is peened over to secure the pin relative to the links in the axial direction. However, an easily removable and replaceable pin is very desirable in some apparatus such as tractor shoes and control chains of the type described in co-pending application Ser. No. 340,952 filed Jan. 29, 1964, assigned to the assignee of the present invention. Replaceable securing means often involve set screws or friction pins which fasten the hinge pin axially and non-rotatably to one of the links. Unfortunately, in practice, the pin often rotates alternately in different links as a result of drive forces, loading and the like. The result is that the friction pin or set screw is sheared, allowing the hinge pin to work out of the link where it can interfere with other machine components and structural members.

Accordingly, it is a principal object of the present invention to provide apparatus for axially securing a hinge pin while permitting rotation relative to either of the links joined thereby.

Another object is to provide a readily removable and replaceable hinge pin.

Other objects and advantages will become apparent from the following description together with the drawing.

Figure 1:
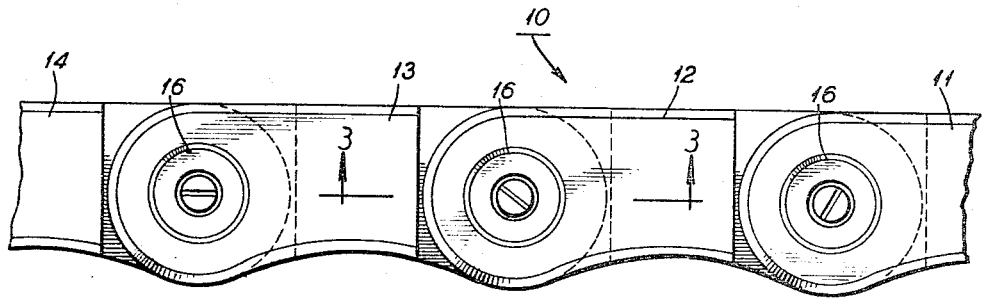
FIGURE 1 is a side view of a chain fragment showing adjacent links connected in serial order.

Referring now more particularly to the drawing, the numeral 10 indicates generally a chain of overlapping links 11, 12, 13, 14 serially connected by pin 16. Link 13 has a tongue 17 which has a circular aperture extending therethrough defined by surface 18. An annular groove 19 is formed in the surface 18 between faces 21 and 22.

Link 12 has a pair of spaced extensions 23 and 24 spanning tongue 17. Extensions 23 and 24 have apertures defined by surfaces 26 and 27 which are in alignment with each other and with the aperture in tongue 17.

Pin 16 has a radial passageway 28 which communicates through an axial passage 29 with internally threaded portion 31. A detent 32 is slideable in passageway 28 and has a length slightly longer than the length of passageway 28. A locking member 33 is slideable and rotatable in passage 29 and has a threaded portion 34 matching threaded portion 31 of pin 16. An inclined surface 36 is formed on the other end of locking member 33.

Figure 3:
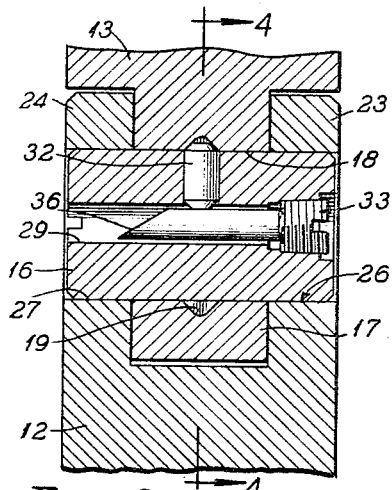
FIG. 3 is a section view taken along the line 3—3 of FIG. 1 showing the various components in assembled position.
Figure 2:
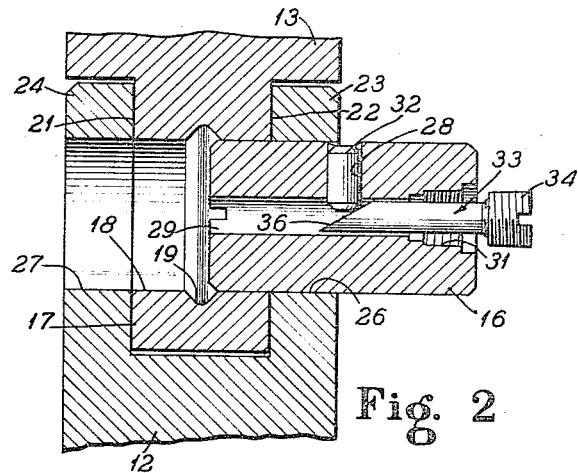
FIG. 2 is a section view taken along the line 3—3 of FIG. 1 showing the positional relationship of the components during installation.
Figure 4:
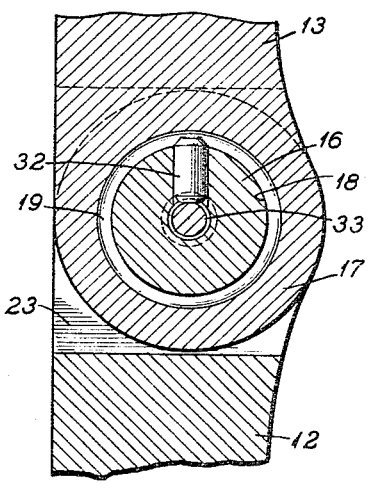
FIG. 4 is a section view taken along the line 4—4 of FIG. 3.

As shown in FIG. 2, a pair of adjacent links 12 and 13 are fitted together with their apertures in axial alignment. Pin 16 is inserted part way, leaving passageway 28 exposed. Detent 32 in installed in passageway 28 and recessed below the surface of pin 16. Pin 16 with detent 32 can then be installed through extensions 23, 24 and tongue 17. As shown in FIG. 3, when pin 16 is properly installed, detent 32 is in alignment with groove 19. Locking member 33 is inserted in pin 16 with angle surface 36 facing detent 32. Surface 36 cams detent 32 outwardly into engagement with groove 19 as it is inserted further into pin 16. Locking member 33 is then held in position by engagement of threaded portions 31 and 34. As shown in FIG. 3, pin 16 is secured against axial movement while permitting any of surfaces 18, 26 or 27 to move relative to the pin surface.

Figure 5:
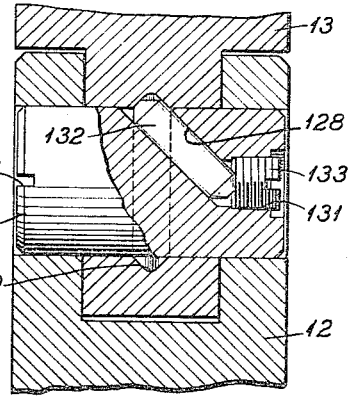
FIG. 5 is a section view similar to FIG. 3 showing an alternate form of pin construction.

A modified form of pin construction is shown in FIG. 5. A pin 116 has an inclined passageway 128 in which a detent 132 is slideable. In this embodiment the locking member 133 can be a set screw bearing against detent 132. Detent 132 is recessed in passageway 128 so that one end rests on threaded counter bore 131 during installation of pin 116. After pin 116 is in place, set screw 133 is turned to drive detent 132 outwardly into engagement with groove 19. A slot 137 is provided for holding pin 116 against rotation while turning set screw 133.

While we have shown and described a preferred and alternate embodiment of our invention, it is to be understood that other variations and modifications are possible within the spirit of the invention and scope of the following claims.

We claim as our invention:

1. In a flexible link chain, means for axially securing a rotatable hinge joint comprising:
   a chain link having a circular aperture extending therethrough provided with an annular groove between the ends thereof;
   a pin rotatable in said circular aperture having an axial internally threaded end portion communicating with a radial passageway;
   a detent slideable along said passageway toward and from said annular groove; and
   a threaded locking member engageable with the threaded end portion of said pin and with said detent, effective to move said detent into engagement with said annular groove responsive to progression of said locking member in said pin.

2. In a flexible link chain, means for axially securing a rotatable hinge joint comprising:
   a chain link having a circular aperture extending therethrough provided with an annular groove between the ends thereof;
   a pin rotatable in said circular aperture having an axial internally threaded end portion communicating with a perpendicular passageway;
   a detent slideable along said passageway toward and from said annular groove; and
   a threaded locking member engageable with the threaded end portion of said pin having an inclined surface engageable with said detent effective to move said detent into engagement with said annular groove responsive to progression of said locking member in said pin.

3. In a flexible link chain, means for axially securing a rotatable hinge joint comprising:
   a chain link having a circular aperture extending therethrough provided with an annular groove between the ends thereof;
   a pin rotatable in said circular aperture having an axial internally threaded end portion communicating with an inclined passageway;

a detent slideable along said passageway toward and from said annular groove; and a threaded locking member engageable with the threaded end portion of said pin having a surface engageable with said detent effective to move said detent into engagement with said annular groove responsive to progression of said locking member in said pin.

4. In a flexible link chain, means for axially securing a rotatable hinge joint comprising:

first and second links having aligned circular apertures extending through overlapping end portions, one of said apertures provided with an annular groove between the ends thereof;

a rotatable pin extending through the aligned apertures of said first and second links having an axial internally threaded end portion communicating with a radial passageway;

a detent slideable along said passageway toward and from said groove; and a threaded locking member engageable with the threaded end portion of said pin having a surface engageable with said detent effective to move said detent into engagement with said groove responsive to progression of said locking member in said pin.

References Cited by the Examiner
UNITED STATES PATENTS

| | | | |
|---|---|---|---|
| 1,079,476 | 11/1913 | Deakins | 59—86 |
| 1,987,928 | 1/1935 | Eckert | 74—251 |
| 3,027,201 | 3/1962 | Blazek | 305—58 |
| 3,144,124 | 8/1964 | Hein | 74—251 |

CHARLES W. LANHAM, *Primary Examiner.*

GENE P. CROSBY, *Assistant Examiner.*